United States Patent
Izumi (10) Patent No.: US 8,279,518 B2
(45) Date of Patent: Oct. 2, 2012

(54) OPTICAL AMPLIFIER

(75) Inventor: Futoshi Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 211 days.

(21) Appl. No.: 12/690,253

(22) Filed: Jan. 20, 2010

(65) Prior Publication Data

US 2010/0118387 A1  May 13, 2010

Related U.S. Application Data (63) Continuation of application No. PCT/JP2007/065841, filed on Aug. 14, 2007.

(51) Int. Cl.
*H04B 10/17* (2006.01)
*H04B 10/12* (2006.01)

(52) U.S. Cl. .............. 359/337; 359/337.5; 359/341.41

(58) Field of Classification Search .......... 359/337, 359/341.41, 337.5
See application file for complete search history.

(56) References Cited

U.S. PATENT DOCUMENTS

| | | | |
|---|---|---|---|
| 6,246,514 B1 * | 6/2001 | Bonnedal et al. | 359/341.41 |
| 6,476,961 B1 * | 11/2002 | Ye et al. | 359/341.43 |
| 6,989,923 B2 * | 1/2006 | Stentz | 359/341.41 |
| 7,038,841 B2 * | 5/2006 | Chang et al. | 359/334 |
| 7,061,668 B2 * | 6/2006 | Maurer et al. | 359/341.41 |
| 7,535,632 B2 * | 5/2009 | Rapp | 359/341.41 |
| 2002/0114066 A1 | 8/2002 | Nakaji | |
| 2008/0024859 A1 * | 1/2008 | Tamaoki | 359/341.31 |
| 2008/0212167 A1 * | 9/2008 | Van Schyndel et al. | 359/341.41 |

FOREIGN PATENT DOCUMENTS

| | | |
|---|---|---|
| JP | 8-179388 | 7/1996 |
| JP | 9-200145 | 7/1997 |
| JP | 11-330595 | 11/1999 |
| JP | 2002-261364 | 9/2002 |

OTHER PUBLICATIONS

English language International Search Report for PCT/JP2007/065841, mailed Sep. 11, 2007.

* cited by examiner

*Primary Examiner* — Eric Bolda
(74) *Attorney, Agent, or Firm* — Staas & Halsey LLP (57) ABSTRACT

An optical amplifier apparatus for amplifying a wavelength division signal light includes a detector for detecting an inputted wavelength division signal light, a dispersion compensator for compensating for a dispersion of the inputted wavelength division signal light, an optical amplifier for amplifying the inputted wavelength division signal light after compensation by stimulated emission of an optical gain medium including a rare-earth element, a propagation delay detector for detecting a propagation delay time of the wavelength division signal light between the detector and the optical amplifier, and a controller for controlling the gain of the optical amplifier on the basis of the propagation delay time such that the change of the gain of the optical amplifier is adjusted by the propagation delay time.

15 Claims, 12 Drawing Sheets

OPTICAL AMPLIFIER

CROSS-REFERENCE TO RELATED APPLICATION

This is a continuation of International Application No. PCT/JP2007/065841 filed on Aug. 14, 2007, the entire contents of which are incorporated herein by reference.

FIELD

An aspect of the embodiments discussed herein is directed to an optical amplifier for amplifying light in an optical wavelength-division multiplexing system.

BACKGROUND

Pulses of optical signals used in optical wavelength-division multiplexing systems experience chromatic dispersion under the effect of optical fibers serving as optical transmission lines. Accordingly, a configuration is known in which optical relay stations and optical receiving stations include dispersion compensators for compensating for chromatic dispersion of optical pulses. Dispersion compensators differ in the amount of dispersion compensation required, depending on the lengths of optical transmission lines up to optical relay stations and optical receiving stations. Differences in the amount of dispersion compensation appear as propagation delays in dispersion compensators. That is, dispersion compensators provided in optical relay stations and optical receiving stations have different propagation delays.

Optical relay stations and optical receiving stations in optical wavelength-division multiplexing systems also include optical amplifiers for amplifying light attenuated through optical transmission lines. Optical amplifiers are known to have different response control timings of optical amplification due to differences in the wavelengths of pump lasers for pumping optical gain media in the optical amplifiers. In particular, a 980 nm pump laser, which is capable of optical amplification with superior noise characteristics, has a relaxation time in which excited electrons responsible for pumping fall to an energy level where they cause stimulated emission. Accordingly, if a variation occurs in the number of optical wavelengths used in an optical wavelength-division multiplexing system, gain adjustment in the optical gain medium lags behind the variation in the optical power input to the optical amplifier. This causes a problem in that a decreased number of optical signal wavelengths results in an excessively high gain per optical signal wavelength.

As a measure against the relaxation time of an optical amplifier, Japanese Laid-open Patent Publication No. 2002-261364 discusses that received light is delayed through a delay line before being input to an optical amplifying unit.

SUMMARY

According to an aspect of an embodiment, an optical amplifier apparatus for amplifying a wavelength division signal light includes a detector for detecting an inputted wavelength division signal light, a dispersion compensator for compensating for a dispersion of the inputted wavelength division signal light, an optical amplifier for amplifying the inputted wavelength division signal light after compensation by stimulated emission of an optical gain medium including a rare-earth element, a propagation delay detector for detecting a propagation delay time of the wavelength division signal light between the detector and the optical amplifier, and a controller for controlling the gain of the optical amplifier on the basis of the propagation delay time such that the change of the gain of the optical amplifier is adjusted by the propagation delay time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

As described previously, in Patent Document 1, additionally, the pump laser of the optical amplifier is controlled depending on the delay time of the delay line. The optical amplifier in Patent Document 1 causes a considerable loss because it requires the delay line.

Embodiments will now be described with reference to the drawings. The configurations of the embodiments are merely illustrative; the present technique is not limited to the configurations of the embodiments.

Figure 1:
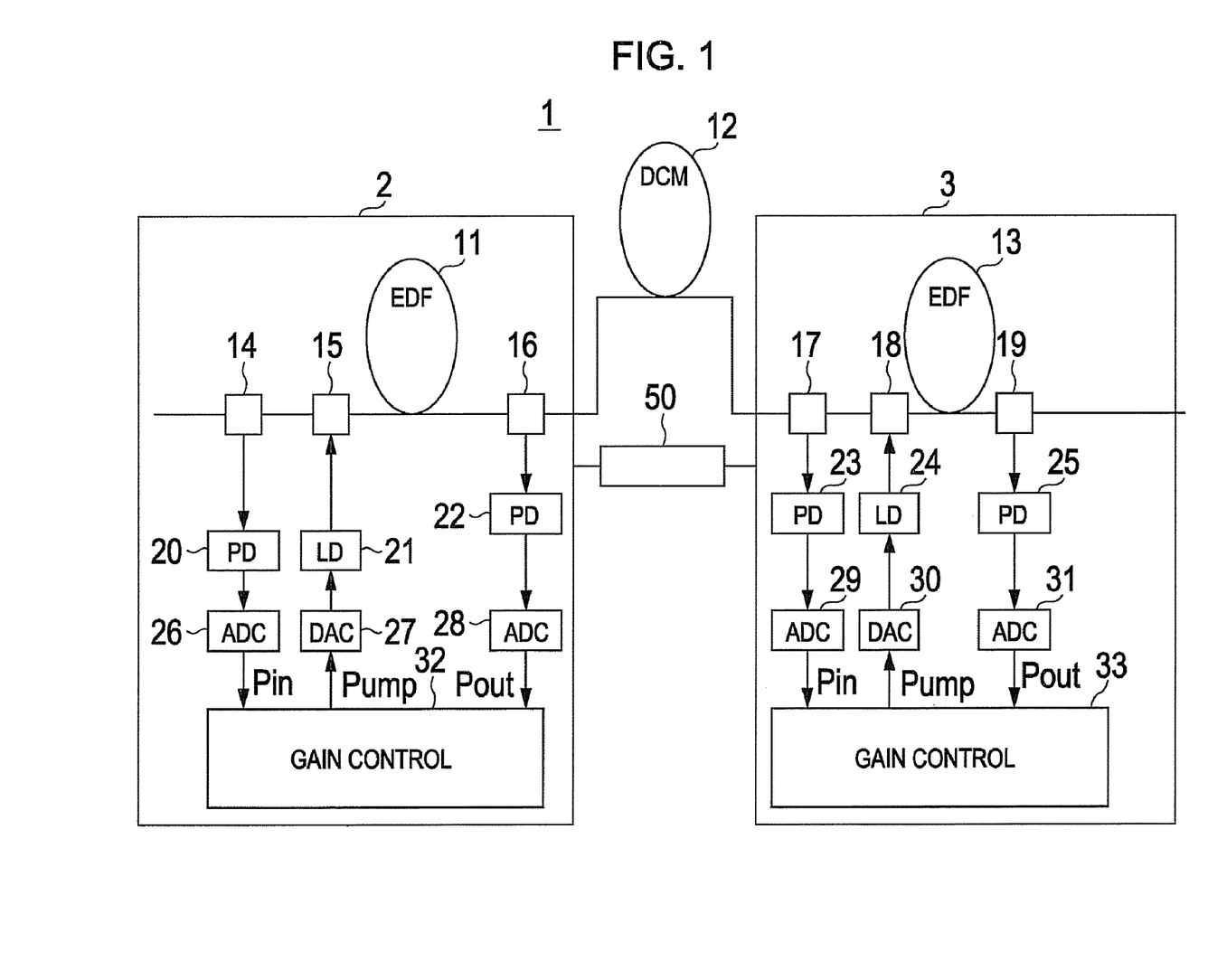
FIG. 1 is a diagram illustrating an optical amplifier applied to an optical communication system.

FIG. 1 illustrates an optical amplifier 1 applied to an optical communication system. For example, the optical amplifier 1 is used for optical wavelength-division multiplexing communication in which a plurality of optical signals are transmitted at different optical wavelengths.

The optical amplifier 1 includes a first optical amplifying unit 2, a second optical amplifying unit 3, a dispersion compensator 12, and a propagation delay detector 50.

The first optical amplifying unit 2 includes optical couplers 14 to 16, an optical gain medium 11, photodetectors 20 and 22, a laser 21, analog-to-digital conversion circuits (ADC) 26 and 28, a digital-to-analog conversion circuit (DAC) 27, and an automatic gain control 32.

The optical coupler 14 bifurcates light from a transmission line and supplies the bifurcated light to the optical coupler 15 and to the photodetector 20. The photodetector 20 converts the light from the optical coupler 14 into an electrical signal and supplies it to the ADC 26. In other words, the photodetector 20 is a detector for detecting the optical power input to the optical amplifier 1. The ADC 26 converts the analog signal from the photodetector 20 into a digital value and supplies it to the automatic gain control 32.

The optical coupler 15 supplies the light from the optical coupler 14 and pump light from the laser 21 to the optical gain medium 11.

The optical gain medium 11 is a quartz optical fiber doped with a rare-earth element. For example, the optical gain medium 11 used may be an erbium-doped quartz optical fiber (EDF). The optical gain medium 11 amplifies the light coming from the optical coupler 14 with the pump light from the optical coupler 15. The optical gain medium 11 supplies the amplified light to the optical coupler 16.

The optical coupler 16 bifurcates the light from the optical gain medium 11 and supplies the bifurcated light to the dispersion compensator 12 and to the photodetector 22. The photodetector 22 converts the light from the optical coupler 16 into an electrical signal and supplies it to the ADC 28. The ADC 28 converts the analog signal from the photodetector 22 into a digital value and supplies it to the automatic gain control 32.

Based on the values from the ADCs 26 and 28, the automatic gain control 32 determines the gain of the first optical amplifying unit 2 from the values corresponding to the optical levels input to and output from the first optical amplifying unit 2 and controls the gain so that it remains constant.

The dispersion compensator 12 changes the state of dispersion of the light supplied from the optical coupler 16 of the first optical amplifying unit 2 and supplies it to the second optical amplifying unit 3. The dispersion compensator 12 has a dispersion corresponding to that of the transmission line. Specifically, the dispersion compensator 12 has a dispersion opposite in sign to that of the transmission line so as to cancel it out. The dispersion compensator 12, however, needs not completely compensate for the dispersion, depending on the configuration of the optical communication system, but may have a dispersion overly or insufficiently compensating for the dispersion of the transmission line. Generally, the dispersion compensator 12 used is a dispersion-compensating fiber, although a VIPA device (see U.S. Pat. No. 5,930,045), for example, may also be used. The amount of dispersion of the dispersion compensator 12 depends on the distance over which light propagates through the dispersion compensation medium. Hence, the propagation distance varies with the value of dispersion compensation of the dispersion compensator 12. Accordingly, the dispersion compensator 12 has a delay depending on the transmission line to which the optical amplifier 1 is connected. The delay of the dispersion compensator 12 is sufficiently longer than the relaxation time (about 2 μs). The relaxation time is the period of time in which electrons of the rare-earth element in the optical gain medium 11 or 13 fall to an energy level where they cause stimulated emission with pump energy.

The second optical amplifying unit 3 includes optical couplers 17 to 19, an optical gain medium 13, photodetectors 23 and 25, a laser 24, ADCs 29 and 31, a DAC 30, and an automatic gain control 33.

The optical coupler 17 bifurcates light from the dispersion compensator 12 and supplies the bifurcated light to the optical coupler 18 and to the photodetector 23. The photodetector 23 converts the light from the optical coupler 17 into an electrical signal and supplies it to the ADC 29. The ADC 29 converts the analog signal from the photodetector 23 into a digital value and supplies it to the automatic gain control 33.

The optical coupler 18 supplies the light from the optical coupler 17 and pump light from the laser 24 to the optical gain medium 13.

The optical gain medium 13 is a quartz optical fiber doped with a rare-earth element. For example, the optical gain medium 13 used may be EDF. The optical gain medium 13 amplifies the light coming from the optical coupler 17 with the pump light from the optical coupler 18. The optical gain medium 13 supplies the amplified light to the optical coupler 19. The optical gain medium 13 performs forward-pumped optical amplification because the optical signal from the optical coupler 17 and the pump light from the laser 24 enters the optical gain medium 13 through the coupler 18.

The optical coupler 19 bifurcates the light from the optical gain medium 13 and outputs one bifurcated portion as the output light of the optical amplifier 1 and supplies the other portion to the photodetector 25. The photodetector 25 converts the light from the optical coupler 19 into an electrical signal and supplies it to the ADC 31. The ADC 31 converts the analog signal from the photodetector 25 into a digital value and supplies it to the automatic gain control 33.

Based on the values from the ADCs 29 and 31, the automatic gain control 33 determines the gain of the second optical amplifying unit 3 from the values corresponding to the optical levels input to and output from the second optical amplifying unit 3 and controls the gain so that it remains constant.

The propagation delay detector 50 detects the propagation delay time between the dispersion compensator 12, or the dispersion compensator 12 and the first optical amplifying unit 2, and the second optical amplifying unit 3. A timing determined by subtracting the relaxation time (about 2 μs) from the propagation delay time detected by the propagation delay detector 50 is supplied to the automatic gain control 33. The propagation delay time is determined by deliberately causing an optical variation in advance at the activation of the optical amplifier 1 and measuring the delay time of the point of change, or by measuring the delay time of light reception at the input of light. The automatic gain control 33 performs gain control of the second optical amplifying unit 3 with a time shift from the timing at which an optical variation occurred, based on the propagation delay time minus the relaxation time.

The gain controls 32 and 33 of the first and second optical amplifying units 2 and 3 separately perform automatic gain control for flattening the gain of the optical amplifier 1. A flattened gain is a quality necessary for optical signals at individual wavelengths to achieve substantially the same power in optical wavelength-division multiplexing communication.

In the automatic gain control, the outputs of the lasers 21 and 24 are changed by comparing gains calculated from power levels measured using the input and output power monitors of the optical amplifying units 2 and 3, with a target value set in advance.

The input power monitor of the first optical amplifying unit 2 corresponds to the optical coupler 14, the photodetector 20, and the ADC 26. The output power monitor of the first optical amplifying unit 2 corresponds to the optical coupler 16, the photodetector 22, and the ADC 28. The input power monitor of the second optical amplifying unit 3 corresponds to the optical coupler 17, the photodetector 23, and the ADC 29. The output power monitor of the second optical amplifying unit 3 corresponds to the optical coupler 19, the photodetector 25, and the ADC 31.

In this case, the pumping powers of the lasers 21 and 24 depend on the total powers input to the optical amplifiers 2 and 3. This is because doubling the power of light of one wave and doubling the power of light of two multiple waves require different pumping powers for the same gain to be achieved.

The automatic gain control is performed in the gain controls 32 and 33 according to the following formulas:

$$Pout/Pin = G$$

$$G - G\_target = \Delta G$$

$$dPump/dG = f(Pout)$$

$$Pump = Pump - dPump/dG * \Delta G$$

where G_target is the target gain, Pin is the input value of the optical amplifying unit 2 or 3 input from the ADC 26 or 29, Pout is the output value of the optical amplifying unit 2 or 3 input from the ADC 28 or 31, G is the actual gain of the optical amplifying unit 2 or 3, ΔG is the difference between the actual gain and the target gain, Pump is the value of the pumping power supplied to the DAC 27 or 30, and dPump/dG is the amount of change in pumping power required for a change in gain (where dPump/dG is represented as a function f because it depends on the output power Pout).

That is, the automatic gain control 33 performs automatic gain control by subtracting the ratio of a change in current pumping power Pump to a change in gain, namely, dPump/dG, multiplied by the difference from the target gain, namely, ΔG. The arithmetic of the above automatic gain control is implemented by a microprocessor.

Figure 2A:
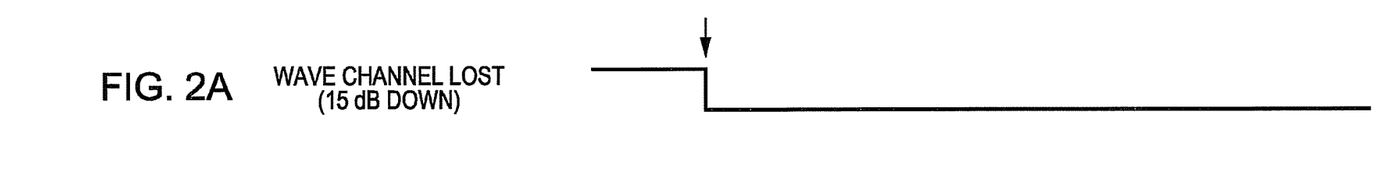
FIGS. 2A-2D are time charts of an embodiment.
Figure 2B:
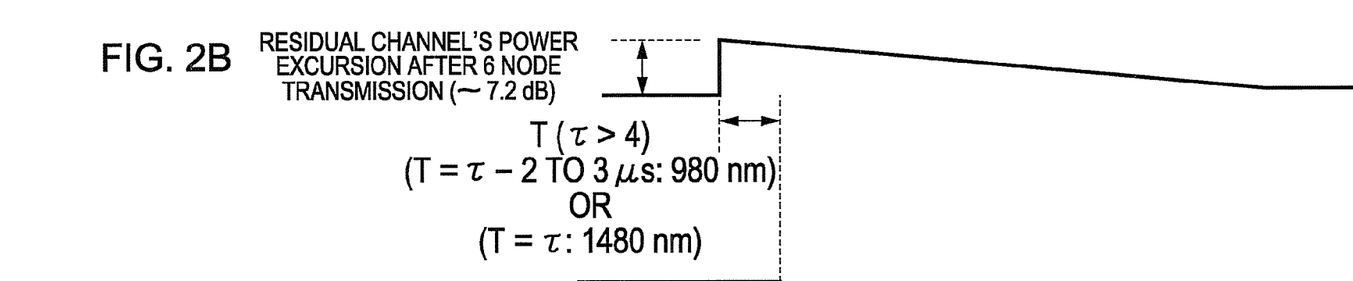
Figure 2C:
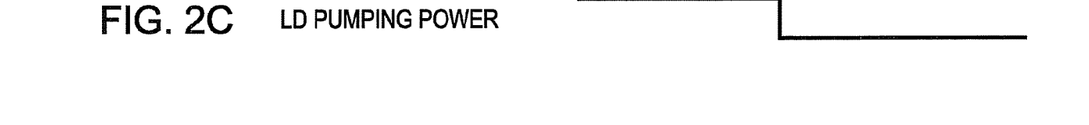
Figure 2D:
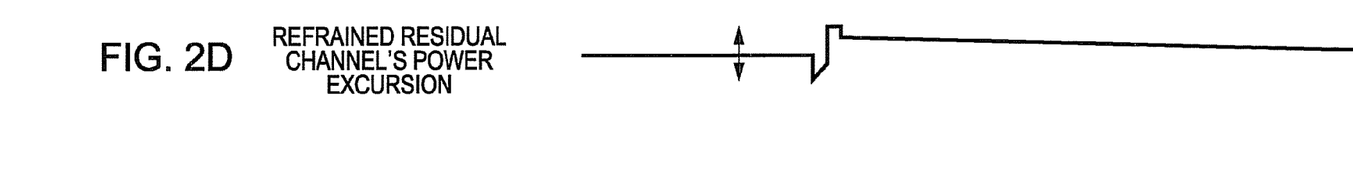

FIGS. 2A to 2D illustrate time charts of the gain control of the optical amplifying unit 3 in the embodiment of FIG. 1. FIG. 2A illustrates the optical power input to the optical amplifier 1. FIG. 2B illustrates the output of the optical amplifier 1 in the case where the embodiment is not employed. FIG. 2C illustrates the pumping power of the laser 24. FIG. 2D illustrates the output of the optical amplifier 1 in the case where the embodiment is employed.

At the timing indicated by the arrow in FIG. 2A, the number of wavelengths of input optical signals (optical channels) changes; this example illustrates the case where the power drops by 15 dB. The light changed at the timing indicated by the arrow in FIG. 2A is delayed in the dispersion compensator 12 by a time τ and is input to the optical amplifying unit 3. In this case, as illustrated in FIG. 2C, the output of the laser 24 is changed with a time shift equal to the delay time τ minus the relaxation time. As a result, as illustrated in FIG. 2D, a momentary variation occurs only at the gap between the pump control timing and the variation output timing. As for the momentary variation time, the output may be continued without a level variation if ideal time adjustment is completely achieved. Even if there is a slight timing difference, the pumping intensity of the pump laser 24 may be lowered in advance to provide the effect of alleviating a level variation.

Figure 3:
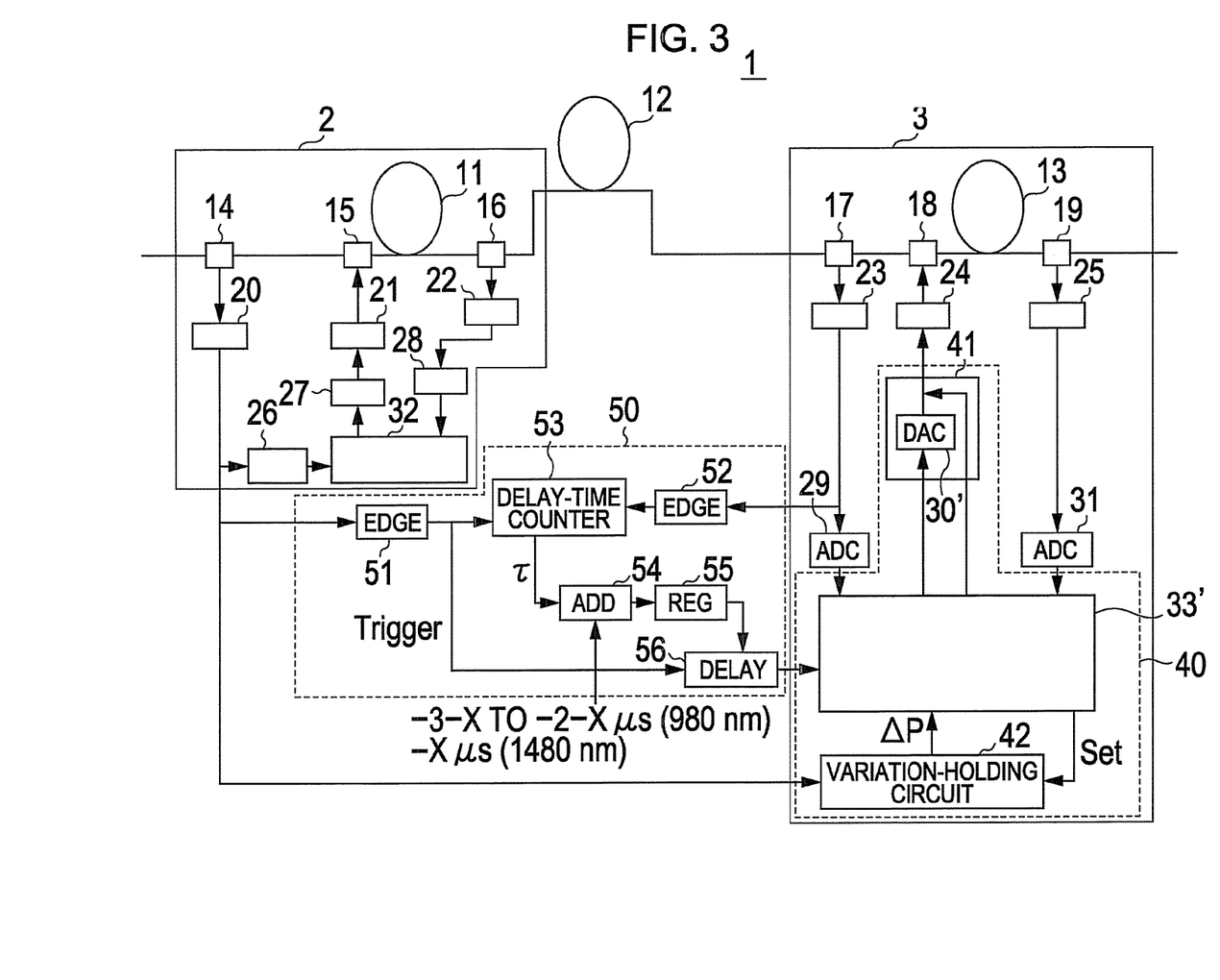
FIG. 3 is a diagram illustrating a first configuration of the optical amplifier.

FIG. 3 illustrates a first configuration of the optical amplifier 1. In FIG. 3, the same members as in the configuration in FIG. 1 are indicated by the same reference numerals, and a description thereof will be omitted.

The propagation delay detector 50 includes a first edge-detecting circuit 51, a second edge-detecting circuit 52, a delay-time counter 53, a relaxation-time subtracter 54, a register 55, and a delay 56.

The first edge-detecting circuit 51 outputs a signal starting the delay-time counter 53 when detecting a change in the electrical signal from the photodetector 20. The second edge-detecting circuit 52 outputs a signal stopping the delay-time counter 53 when detecting a change in the electrical signal from the photodetector 23.

The delay-time counter 53 starts counting when receiving the signal from the first edge-detecting circuit 51 and stops counting when receiving the signal from the second edge-detecting circuit 52. The delay-time counter 53 supplies the count to the relaxation-time subtracter 54. The delay-time counter 53 counts the propagation delay time from the optical coupler 14 to the optical coupler 17. That is, the delay-time counter 53 counts the propagation delay time in the stage preceding the second optical amplifying unit 3, including the dispersion compensator 12.

The relaxation-time subtracter 54 subtracts the relaxation time from the propagation delay time supplied from the delay-time counter 53. The relaxation time herein refers to the period of time in which electrons of the rare-earth element in the optical gain medium 13 fall to an energy level where they cause stimulated emission with the pump light of the optical amplifying unit 3. For example, the relaxation time for pump light with a wavelength of 980 nm is 2 μs to 3 μs, and the relaxation time for pump light with a wavelength of 1,480 nm is zero. Accordingly, a relaxation time of 2 μs to 3 μs may be subtracted from the propagation delay time for pump light with a wavelength of 980 nm, whereas a relaxation time of zero may be subtracted from the propagation delay time for pump light with a wavelength of 1,480 nm. The relaxation-time subtracter 54 supplies the arithmetic result to the register 55.

The register 55 holds the arithmetic result from the relaxation-time subtracter 54 and fixes the amount of delay of the delay 56 based on the arithmetic result. The delay 56 delays the signal supplied from the first edge-detecting circuit 51 by the time held in the register 55. The delay 56 supplies the delayed signal to the gain control 40.

Figure 4:
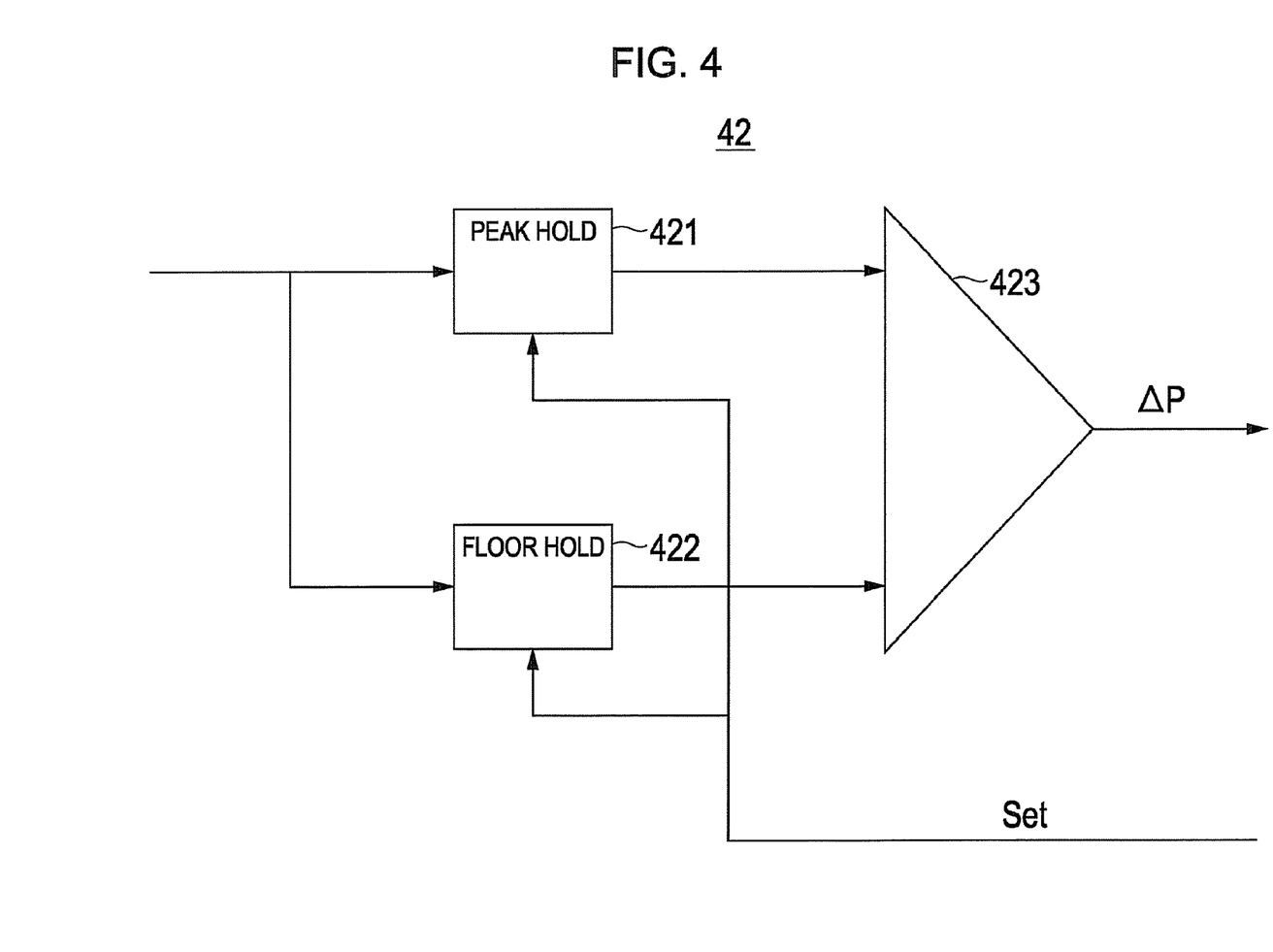
FIG. 4 is a diagram illustrating the configuration of a variation-holding circuit.

The gain control 40 includes a laser controller 41, a variation-holding circuit 42, and a microprocessor 33'. The variation-holding circuit 42 detects the amount of change ΔP in the optical power input to the first optical amplifying unit 2. FIG. 4 illustrates the configuration of the variation-holding circuit 42 in FIG. 3. The variation-holding circuit 42 includes a peak-detecting circuit 421, a bottom-detecting circuit 422, and an arithmetic circuit 423.

The peak-detecting circuit 421 detects the peak value of the signal from the photodetector 20, which serves as the input monitor of the first optical amplifying unit 2. The peak-detecting circuit 421 supplies the detection result to the arithmetic circuit 423. The bottom-detecting circuit 422 detects the bottom value (floor value) of the signal from the photodetector 20, which serves as the input monitor of the first optical amplifying unit 2. The bottom-detecting circuit 422 supplies the detection result to the arithmetic circuit 423. The peak-detecting circuit 421 and the bottom-detecting circuit 422 detect and hold a variation by comparison with the power level in a normal state. Accordingly, the power level of the peak-detecting circuit 421 and the bottom-detecting circuit 422 is set a predetermined period of time after adjustment of the pump laser 24. The above operation of the peak-detecting circuit 421 and the bottom-detecting circuit 422 is intended to alleviate a variation in the output level of the optical amplifier 1 after a variation in the input level of the optical amplifier 1 occurs.

The transient response needs very high speed gain control. If the gain control is too fast, it may create fluctuation in actual network. As long as the fast response works only when the power variation is beyond the thresholds, we may avoid the unstable fluctuation by normal power variation. In FIG. 4, the high speed transient response works only when the power variation is too large. It means that the high speed transient control has "the deadband" which means the insensitive range for the power variation. If the power variation is small, the residual channel may not cause any problem.

The signal Set may be asserted by the microprocessor 33' after activation of the pump laser 24. This may be executed, for example, at the timing when all Trg signals in FIG. 5 return to a normal automatic gain control state.

The arithmetic circuit 423 detects the amount of change ΔP in the optical power input to the first optical amplifying unit 2 based on the values supplied from the peak-detecting circuit 421 and the bottom-detecting circuit 422. The arithmetic circuit 423 used may be an operational amplifier.

Figure 5:
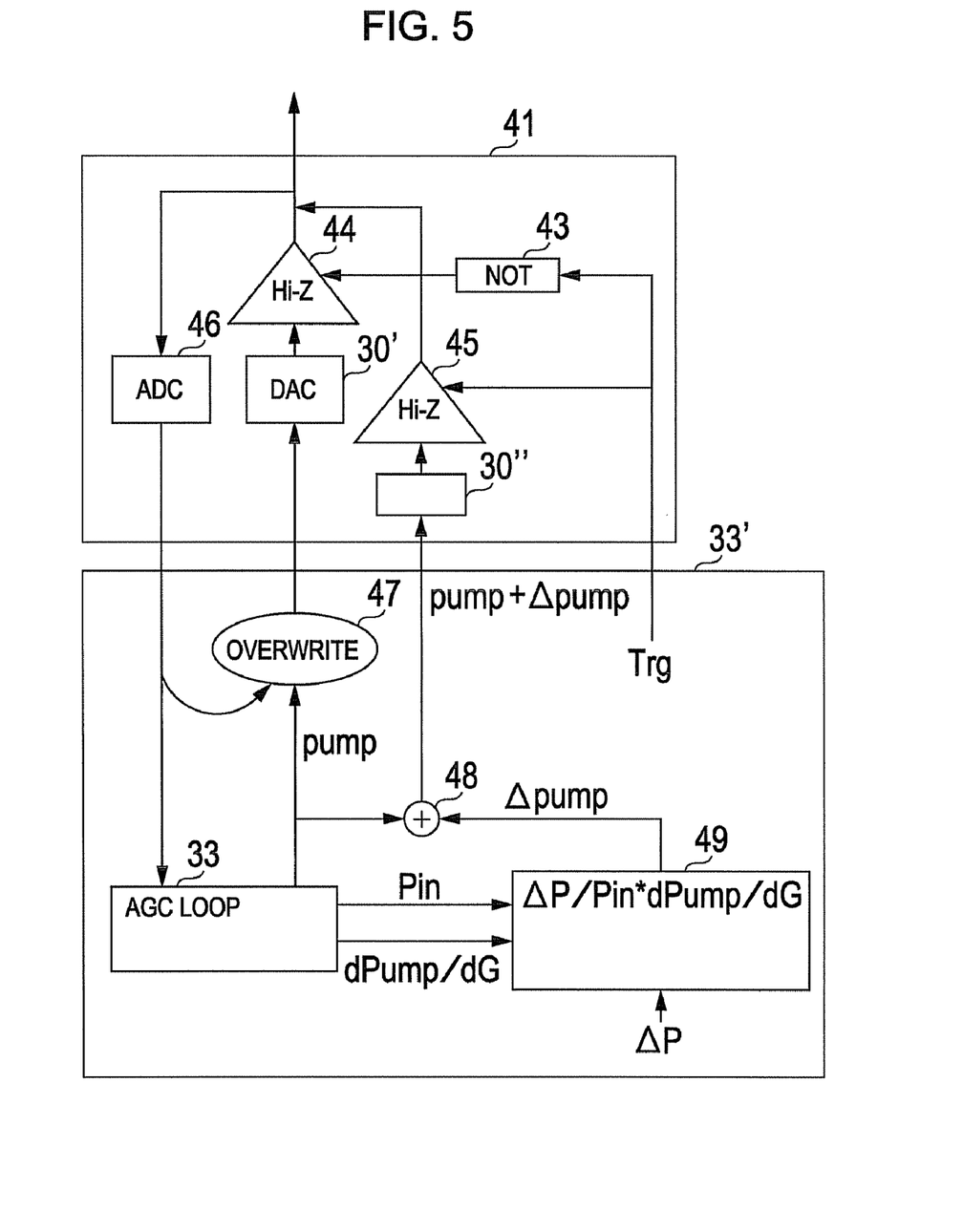
FIG. 5 is a diagram illustrating the configuration of a microprocessor and a laser controller.

FIG. 5 illustrates the configuration of the microprocessor 33' and the laser controller 41 in FIG. 3. The microprocessor 33' functions as the automatic gain control 33 in FIG. 1. In addition, the microprocessor 33' functions as a change-in-pumping-power calculating section 49 that calculates a change in pumping power, Δpump, from the change in signal, ΔP. In addition, the microprocessor 33' functions as a pumping-power calculating section 48 that calculates the pumping power, pump+Δpump, corresponding to the change in the input signal to the optical amplifier 1 by adding the change in pumping power, Δpump, to the pumping power. In addition, the microprocessor 33' functions as a register 47 that temporarily holds the value of pumping power supplied to a DAC 30'.

The automatic gain control 33 performs the arithmetic operation described with reference to FIG. 1. The change-in-pumping-power calculating section 49 determines the change in pumping power, Δpump, from the values used in the operation of the automatic gain control 33, that is, the input of the optical amplifying unit 3, namely, Pin, and the ratio of a change in current pumping power, pump, to a change in gain, namely, dPump/dG, and from the output of the variation-holding circuit 42, namely, ΔP, by the following arithmetic:

$$\Delta pump = \Delta P/Pin \times dPump/dG$$

The laser controller 41 includes a first high-impedance circuit 44, a second high-impedance circuit 45, DACs 30' and 30", an ADC 46, and an inverter 43.

The DAC 30' converts the value of pumping power, pump, from the register 47 into an analog value and supplies it to the first high-impedance circuit 44. The first high-impedance circuit 44 controls the output of the DAC 30' in response to a control signal from the inverter 43.

The DAC 30" converts the value of pumping power, pump+Δpump, from the pumping-power calculating section 48 into an analog value and supplies it to the second high-impedance circuit 45. The second high-impedance circuit 45 controls the output of the DAC 30" in response to the trigger signal (Trg or Trigger) from the propagation delay detector 50.

The inverter 43 inverts the trigger signal (Trg or Trigger) from the propagation delay detector 50 and supplies it to the first high-impedance circuit 44.

Thus, if the trigger signal (Trg or Trigger) from the propagation delay detector 50 is "1", the output of the laser controller 41 is the output of the second high-impedance circuit 45. If the trigger signal (Trg or Trigger) from the propagation delay detector 50 is "0", the output of the laser controller 41 is the output of the first high-impedance circuit 44. The ADC 46 digitizes the output of the laser controller 41 and supplies it to the microprocessor 33'. The delayed trigger signal from the propagation delay detector 50 may be input to the laser controller 41 either directly or via the microprocessor 33'.

The microprocessor 33', which does not operate so fast that it may follow a level variation, constantly uses the output of the laser controller 41 for automatic gain control; that is, the microprocessor 33' (level-variation controller) constantly reads the laser control value set for alleviating the level variation of the optical amplifier 1. After a level variation occurs, the automatic gain control starts from the set laser control value.

Figure 6:
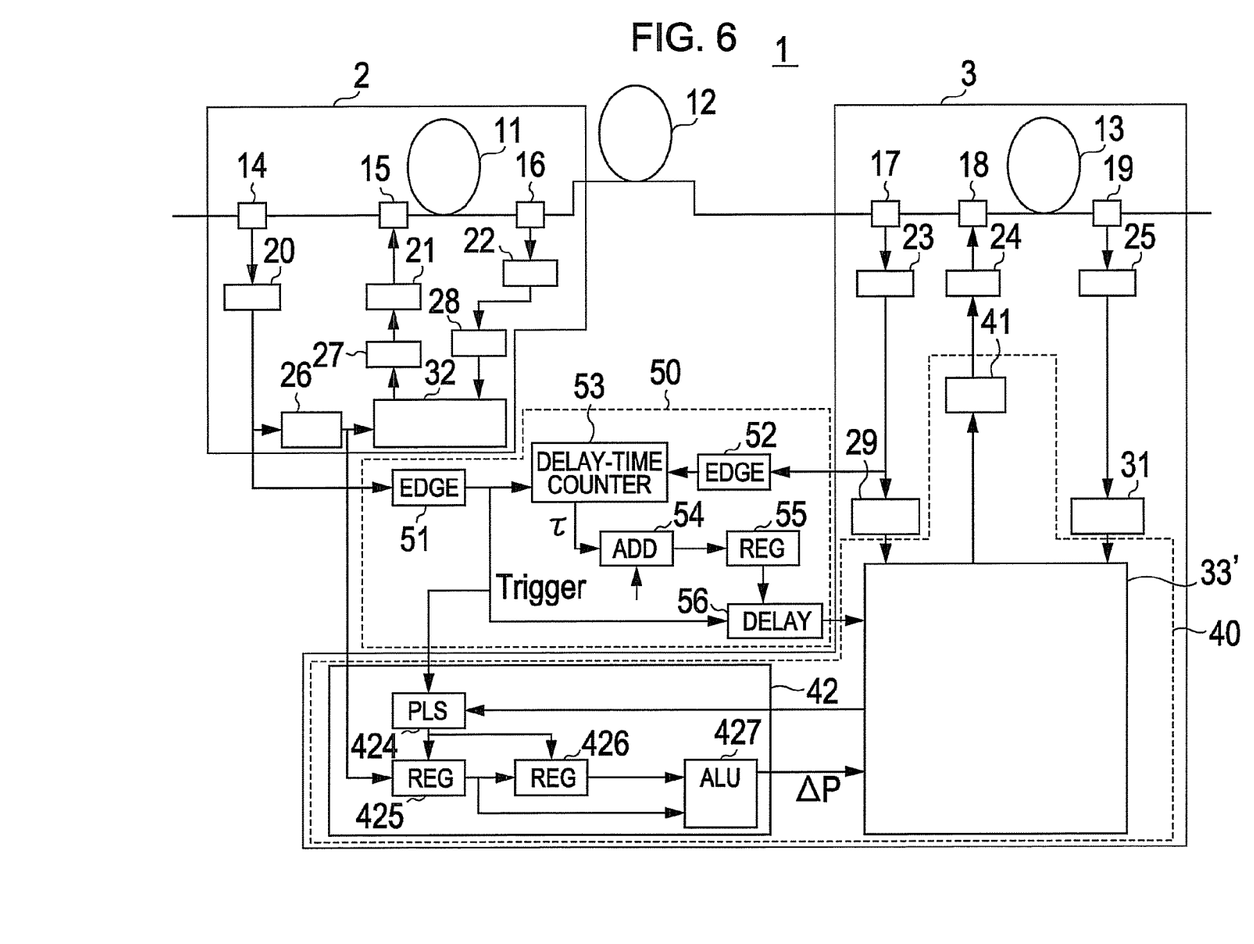
FIG. 6 is a diagram illustrating a second configuration of the optical amplifier.

FIG. 6 illustrates a second configuration of the optical amplifier 1. In FIG. 6, the same members as in the configuration in FIG. 3 are indicated by the same reference numerals, and a description thereof will be omitted. The configuration in FIG. 6 differs in the configuration of the variation-holding circuit 42. While the variation-holding circuit 42 in FIG. 3 is formed of an analog circuit, the variation-holding circuit 42 in the example illustrated in FIG. 6 is formed of a digital circuit. The variation-holding circuit 42 includes registers 425 and 426, an arithmetic circuit 427, and a pulse-generating circuit 424.

The register 425 holds the value from the DAC 26. The register 426 holds the value from the register 425. The pulse-generating circuit 424 outputs a plurality of pulses to the registers 425 and 426 for a predetermined period of time. In response to the pulses from the pulse-generating circuit 424, the register 425 supplies the value that it holds to the register 426 and the arithmetic circuit 427. The arithmetic circuit 427 calculates the amount of change ΔP based on the values from the registers 425 and 426. The arithmetic circuit 427 supplies the output ΔP to the microprocessor 33'. The microprocessor 33' and the laser controller 41 perform the gain control of the second optical amplifying unit 3 based on the delayed trigger signal from the propagation delay detector 50.

Figure 7:
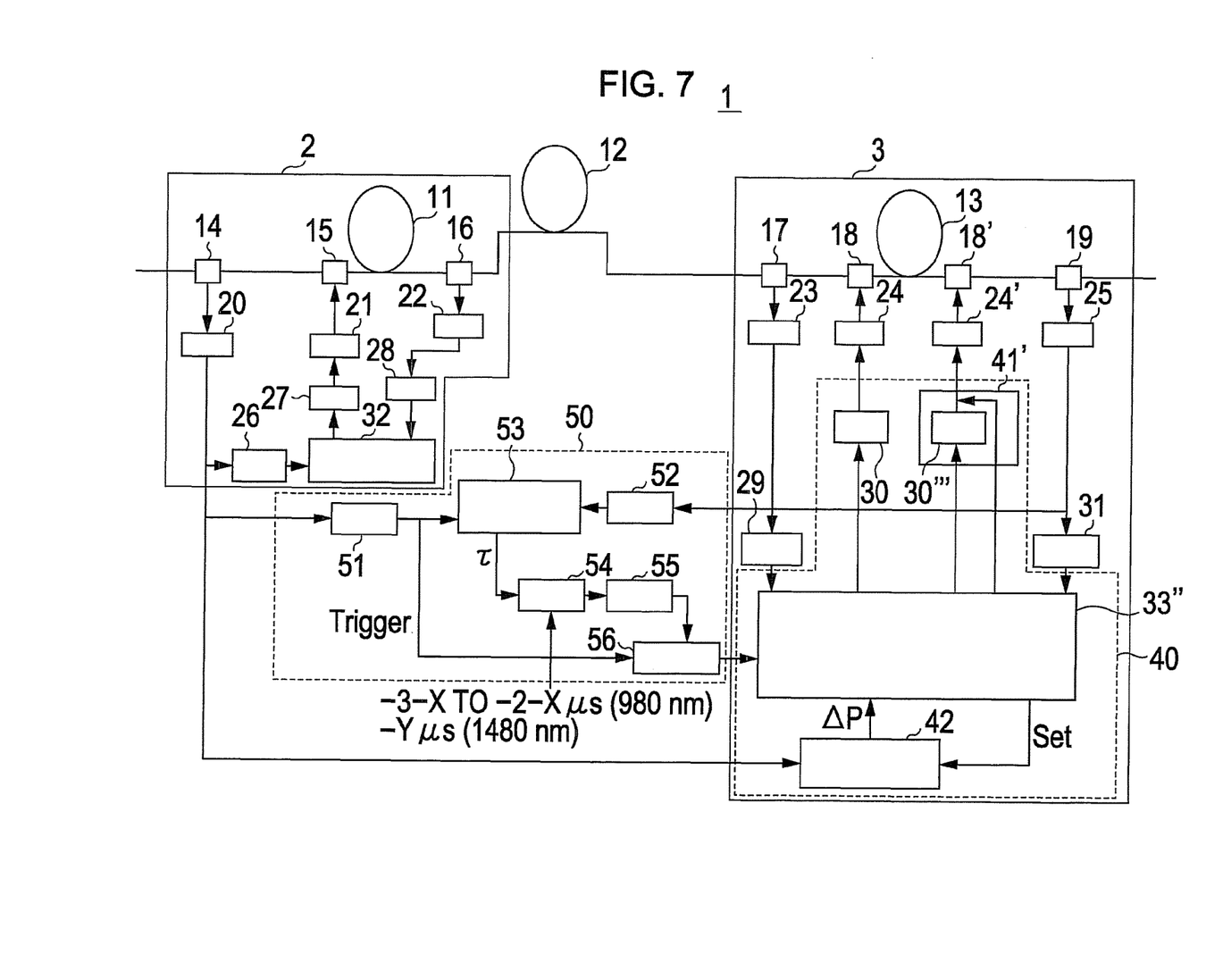
FIG. 7 is a diagram illustrating a third configuration of the optical amplifier.

FIG. 7 illustrates a third configuration of the optical amplifier 1. In FIG. 7, the same members as in the configuration in FIG. 3 are indicated by the same reference numerals, and a description thereof will be omitted. The configuration in FIG. 7 differs from that in FIG. 3 in that the second edge-detecting circuit 52 of the propagation delay detector 50 detects the signal, from the photodetector 25, serving as the output of the second optical amplifying unit 3. That is, the delay-time counter 53 counts the propagation delay time up to the output stage of the second optical amplifying unit 3, including the dispersion compensator 12.

In FIG. 7, in addition to the forward-pumping laser 24, the second optical amplifying unit 3 includes a backward-pumping laser 24'. The backward-pumping laser 24' supplies pump light to the optical gain medium 13 via an optical coupler 18'. The optical gain medium 11 is bidirectionally pumped with the pump light from the lasers 24 and 24'.

The laser 24 is subjected only to automatic gain control by a microprocessor 33". The laser 24' is controlled by a laser controller 41' and the microprocessor 33". The laser controller 41' operates in the same way as the laser controller 41 in FIG. 5. The microprocessor 33" operates in the same way as the microprocessor 33' in FIG. 5. That is, the laser 24' is subjected to gain control corresponding to variations in input optical power.

The second optical amplifying unit 3 in the third configuration may employ the forward-pumping configuration in FIG. 3 except that the second edge-detecting circuit 52 of the propagation delay detector 50 detects the signal, from the photodetector 25, serving as the output of the second optical amplifying unit 3.

Figure 8:
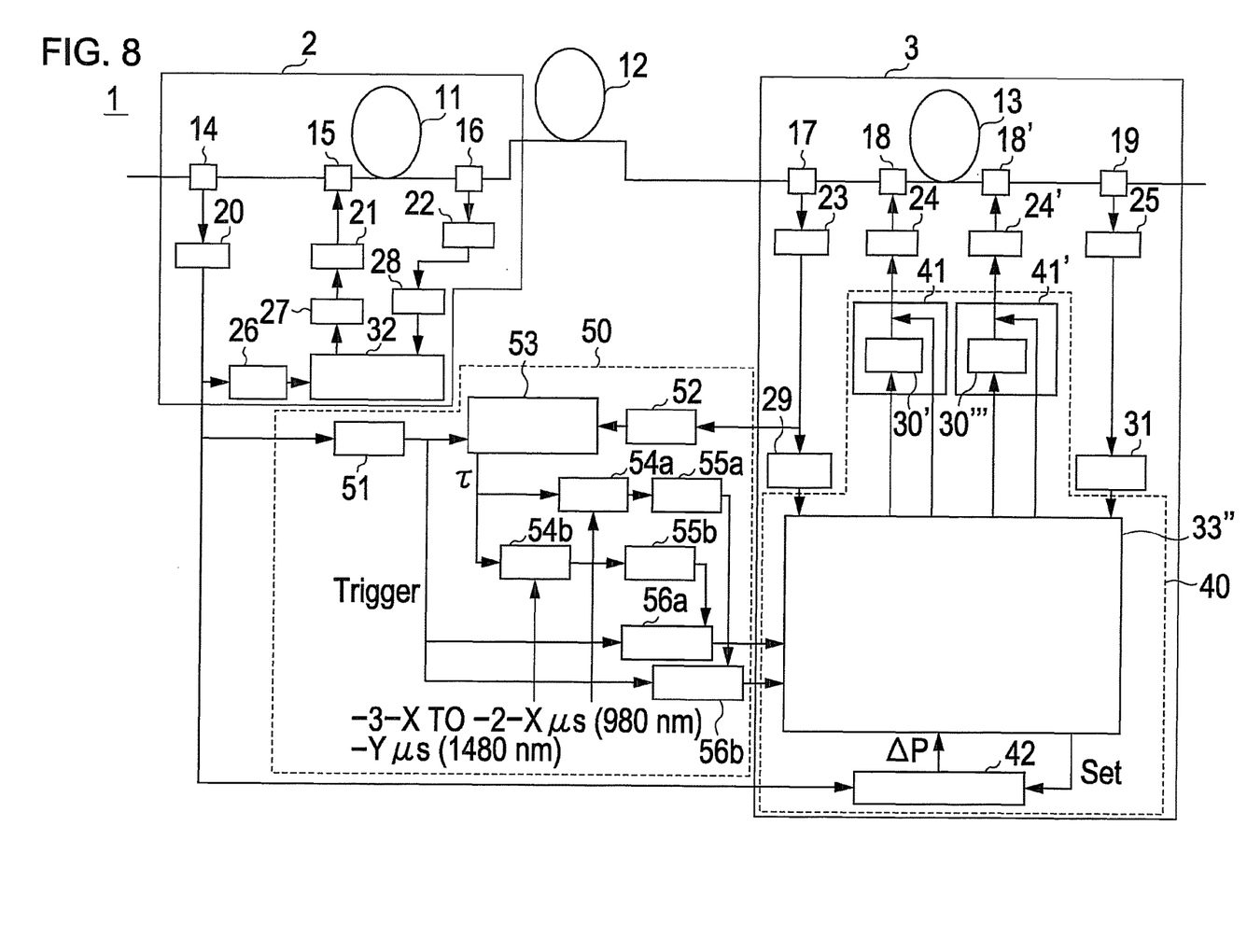
FIG. 8 is a diagram illustrating a fourth configuration of the optical amplifier.

FIG. 8 illustrates a fourth configuration of the optical amplifier 1. In FIG. 8, the same members as in the configuration in FIG. 7 are indicated by the same reference numerals, and a description thereof will be omitted. In FIG. 8, the forward-pumping laser 24 of the optical amplifying unit 3 is also subjected to gain control corresponding to variations in input optical power by the laser controller 41 and the microprocessor 33".

The propagation delay detector 50 includes an edge-detecting circuit 51, an edge-detecting circuit 52, a delay-time counter 53, relaxation-time subtracters 54a and 54b, registers 55a and 55b, and delays 56a and 56b.

The edge-detecting circuit 51 outputs a signal starting the delay-time counter 53 when detecting a change in the electrical signal from the photodetector 20. The edge-detecting circuit 52 outputs a signal stopping the delay-time counter 53 when detecting a change in the electrical signal from the photodetector 23.

The delay-time counter 53 starts counting when receiving the signal from the edge-detecting circuit 51 and stops counting when receiving the signal from the edge-detecting circuit 52. The delay-time counter 53 supplies the count to the relaxation-time subtracters 54a and 54b. The delay-time counter 53 counts the propagation delay time from the optical coupler 14 to the optical coupler 17. That is, the delay-time counter 53 counts the propagation delay time in the stage preceding the second optical amplifying unit 3, including the dispersion compensator 12.

The relaxation-time subtracters 54a and 54b subtract the relaxation time from the propagation delay time supplied from the delay-time counter 53. The relaxation time herein refers to the period of time in which electrons of the rare-earth element fall to an energy level where they cause stimulated emission with the pump light of the optical amplifying unit 3. For example, the relaxation time for pump light with a wavelength of 980 nm is 2 μs to 3 μs, and the relaxation time for pump light with a wavelength of 1,480 nm is zero. Accordingly, a relaxation time of 2 μs to 3 μs may be subtracted from the propagation delay time for pump light with a wavelength of 980 nm. The relaxation-time subtracters 54a and 54b supply the arithmetic results to the registers 55a and 55b, respectively.

The registers 55a and 55b hold the arithmetic results from the relaxation-time subtracters 54a and 54b and fix the amounts of delay of the delays 56a and 56b, respectively, based on the arithmetic results. The delays 56a and 56b delay the signal supplied from the edge-detecting circuit 51 by the time held in the registers 55a and 55b. The delays 56a and 56b supply the delayed signals to the gain control 40. The trigger signal from the delay 56a is used to control the laser controller 41. The trigger signal from the delay 56b is used to control the laser controller 41'.

Figure 9:
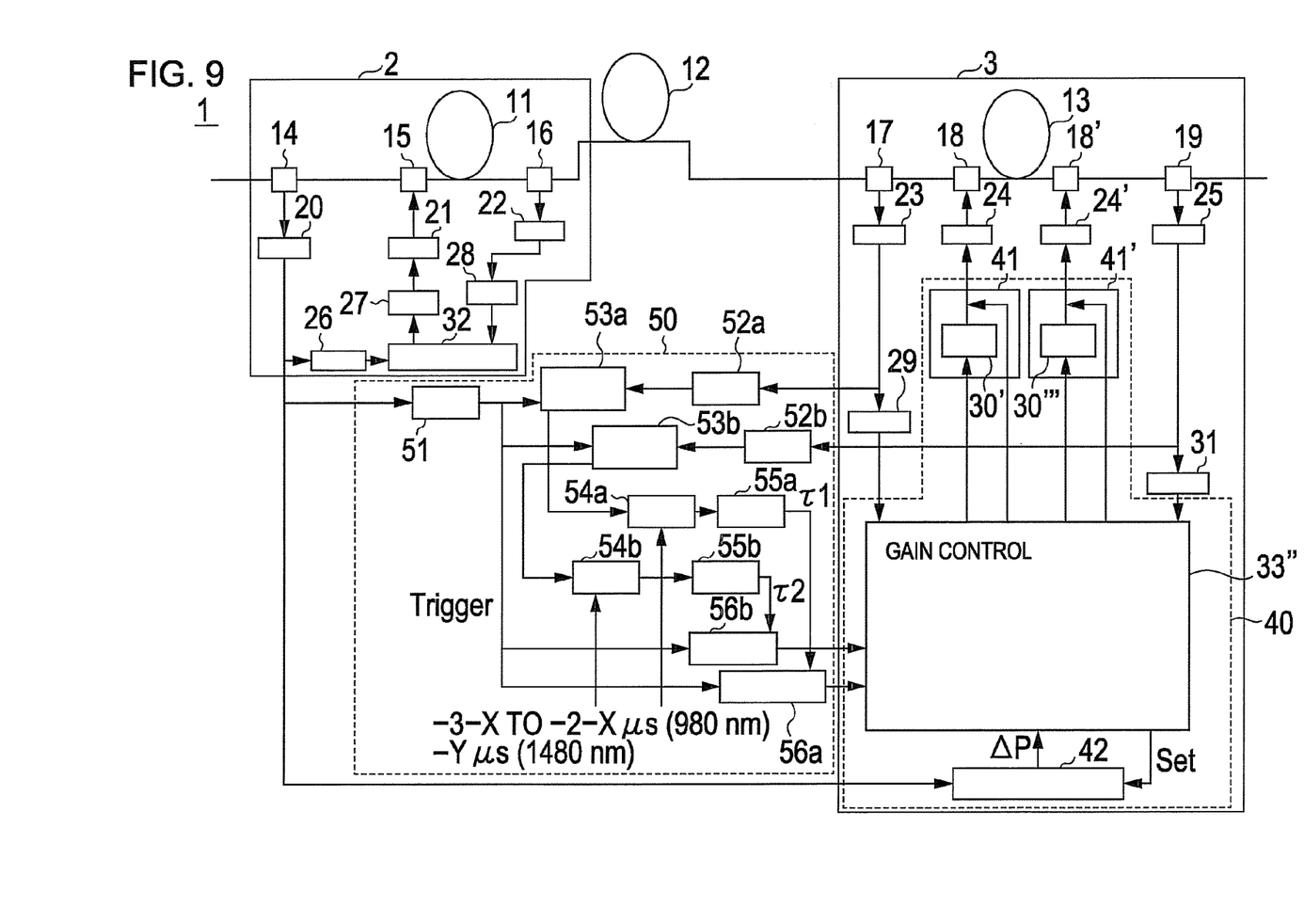
FIG. 9 is a diagram illustrating a fifth configuration of the optical amplifier.

FIG. 9 illustrates a fifth configuration of the optical amplifier 1. In FIG. 9, the same members as in the configuration in FIG. 8 are indicated by the same reference numerals, and a description thereof will be omitted. The configuration in FIG. 9 differs from that in FIG. 8 in the configuration of the propagation delay detector 50 and correspondingly in the control by the microprocessor 33".

The propagation delay detector 50 includes edge-detecting circuits 51, 52a, and 52b, delay-time counters 53a and 53b, relaxation-time subtracters 54a and 54b, registers 55a and 55b, and delays 56a and 56b.

The edge-detecting circuit 51 outputs a signal starting the delay-time counter 53a when detecting a change in the electrical signal from the photodetector 20. The edge-detecting circuit 52a outputs a signal stopping the delay-time counter 53a when detecting a change in the electrical signal from the photodetector 23. The delay-time counter 53a starts counting when receiving the signal from the edge-detecting circuit 51 and stops counting when receiving the signal from the edge-detecting circuit 52a. The delay-time counter 53a supplies the count to the relaxation-time subtracter 54a.

The relaxation-time subtracter 54a subtracts the relaxation time from the propagation delay time supplied from the delay-time counter 53a. The relaxation time herein refers to the period of time in which electrons of the rare-earth element fall to an energy level where they cause stimulated emission with the pump light of the optical amplifying unit 3. For example, the relaxation time for pump light with a wavelength of 980 nm is 2 μs to 3 μs, and the relaxation time for pump light with a wavelength of 1,480 nm is zero. Accordingly, a relaxation time of 2 μs to 3 μs may be subtracted from the propagation delay time for pump light with a wavelength of 980 nm. The relaxation-time subtracter 54a supplies the arithmetic result to the register 55a.

The register 55a holds the arithmetic result from the relaxation-time subtracter 54a and fixes the amount of delay of the delay 56a based on the arithmetic result. The delay 56a delays the signal supplied from the edge-detecting circuit 51 by the time held in the register 55a. The delay 56a supplies the delayed signal to the gain control 40. The trigger signal from the delay 56a is used to control the laser controller 41.

The delay-time counter 53a counts the propagation delay time from the optical coupler 14 to the optical coupler 17. That is, the delay-time counter 53a counts the propagation delay time in the stage preceding the second optical amplifying unit 3, including the dispersion compensator 12.

The edge-detecting circuit 51 outputs a signal starting the delay-time counter 53b when detecting a change in the electrical signal from the photodetector 20. The edge-detecting circuit 52b outputs a signal stopping the delay-time counter 53b when detecting a change in the electrical signal from the photodetector 25. The delay-time counter 53b starts counting when receiving the signal from the edge-detecting circuit 51 and stops counting when receiving the signal from the edge-detecting circuit 52b. The delay-time counter 53b supplies the count to the relaxation-time subtracter 54b.

The relaxation-time subtracter 54b subtracts the relaxation time from the propagation delay time supplied from the delay-time counter 53b. The relaxation time herein refers to the period of time in which electrons of the rare-earth element fall to an energy level where they cause stimulated emission with the pump light of the optical amplifying unit 3. For example, the relaxation time for pump light with a wavelength of 980 nm is 2 μs to 3 μs, and the relaxation time for pump light with a wavelength of 1,480 nm is zero. Accordingly, a relaxation time of 2 μs to 3 μs may be subtracted from the propagation delay time for pump light with a wavelength of 980 nm. The relaxation-time subtracter 54b supplies the arithmetic result to the register 55b.

The register 55b holds the arithmetic result from the relaxation-time subtracter 54b and fixes the amount of delay of the delay 56b based on the arithmetic result. The delay 56b delays the signal supplied from the edge-detecting circuit 51 by the time held in the register 55b. The delay 56b supplies the delayed signal to the gain control 40. The trigger signal from the delay 56b is used to control the laser controller 41.

The delay-time counter 53b counts the propagation delay time from the optical coupler 14 to the optical coupler 19. That is, the delay-time counter 53b counts the propagation delay time up to the output stage of the second optical amplifying unit 3, including the dispersion compensator 12.

The microprocessor 33" has the same function as the microprocessor 33' in FIG. 5. However, because the laser controllers 41 and 41' are provided in FIG. 9, the function in FIG. 5 is provided for each of the laser controllers 41 and 41'. The laser controller 41 is supplied with the trigger signal from the delay 56a directly or via the microprocessor 33". The laser controller 41' is supplied with the trigger signal from the delay 56b directly or via the microprocessor 33".

Figure 10:
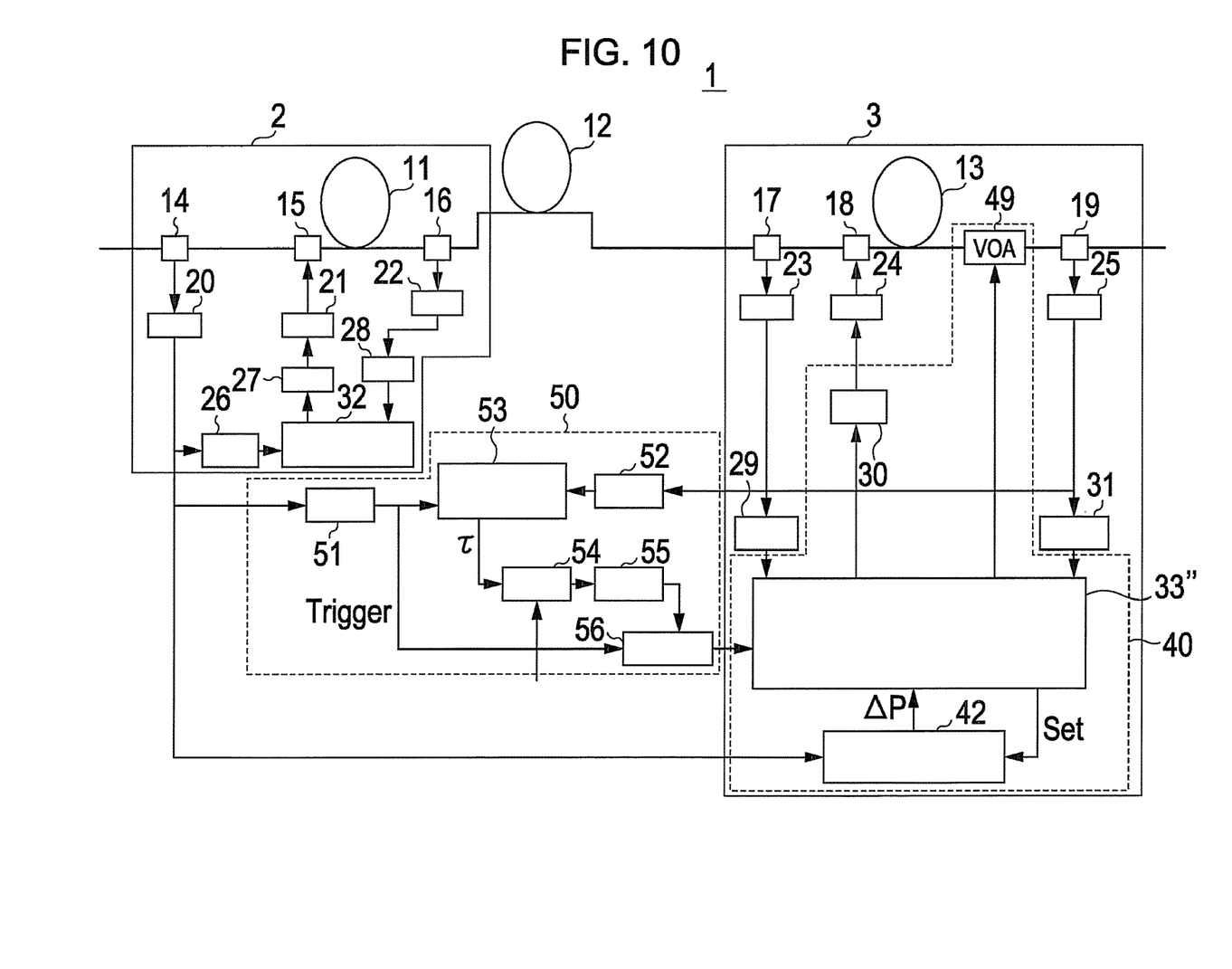
FIG. 10 is a diagram illustrating a sixth configuration of the optical amplifier.

FIG. 10 illustrates a sixth configuration of the optical amplifier 1. In FIG. 10, the same members as in the configuration in FIG. 7 are indicated by the same reference numerals, and a description thereof will be omitted. The configuration in FIG. 10 differs from the other configurations in that the gain adjustment is performed by an optical attenuator 49.

The optical attenuator 49 is disposed between the optical gain medium 13 and the optical coupler 19. The laser 24 is subjected only to automatic gain control by the microprocessor 33". The second edge-detecting circuit 52 of the propagation delay detector 50 detects the signal, from the photodetector 25, serving as the output of the second optical amplifying unit 3.

The microprocessor 33" operates in the same way as the microprocessor 33' in FIG. 5. However, the amount of attenuation Δpump is supplied to the optical attenuator 49.

Figure 11:
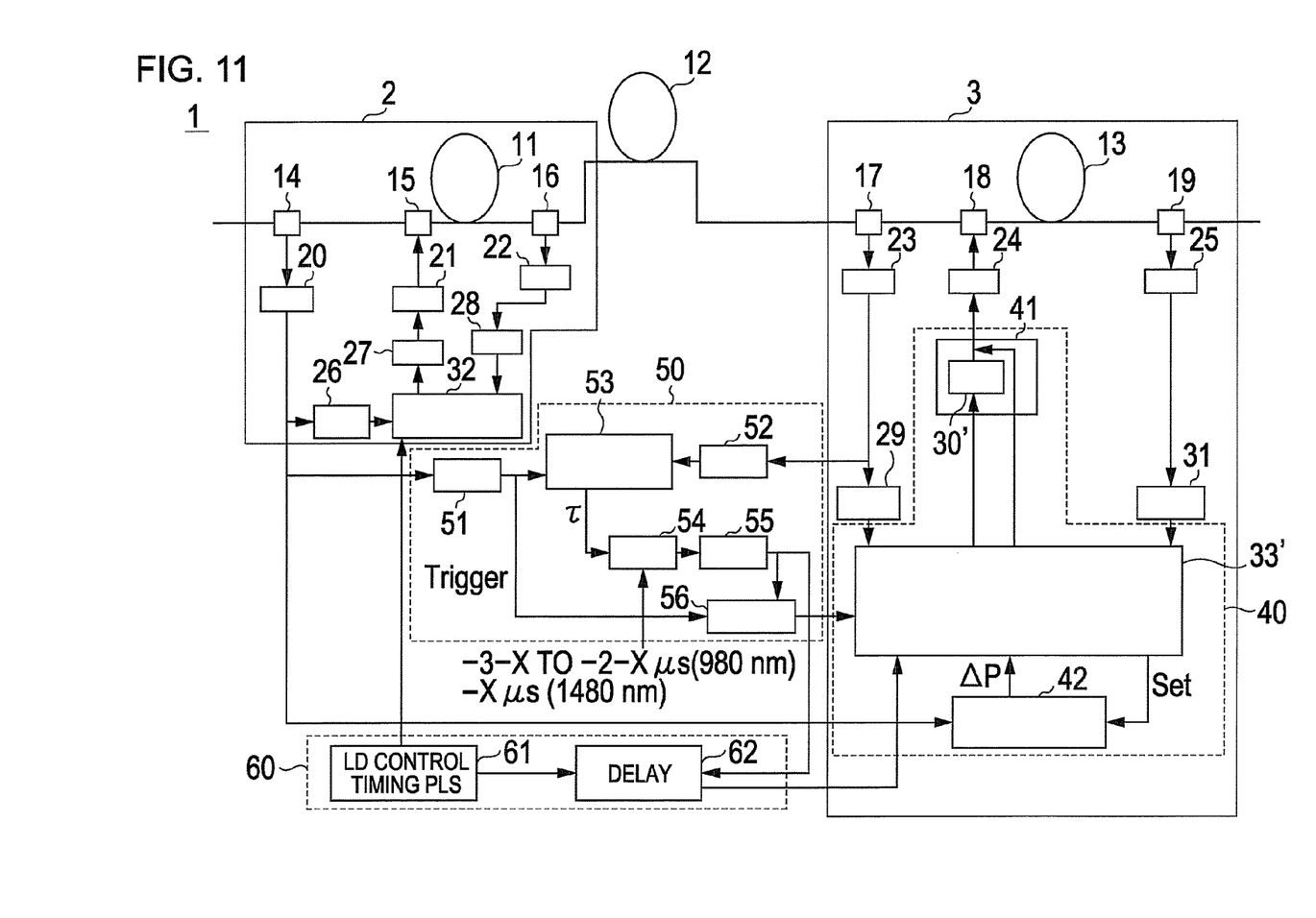
FIG. 11 is a diagram illustrating a seventh configuration of the optical amplifier.

FIG. 11 illustrates a seventh configuration of the optical amplifier 1. In FIG. 11, the same members as in the configuration in FIG. 3 are indicated by the same reference numerals, and a description thereof will be omitted. The configuration in FIG. 11 differs from that in FIG. 3 in that a pump-light control timing circuit 60 is added. The pump-light control timing circuit 60 is a circuit for synchronizing the timings of automatic gain control performed in the first and second optical amplifying units 2 and 3 by taking into account the delay time of the dispersion compensator 12.

The pump-light control timing circuit 60 includes a pump-light control timing pulse circuit 61 and a delay circuit 62.

The pump-light control timing pulse circuit 61 is a circuit for generating a control pulse for providing the timing for pumping operation of the first and second optical amplifying units 2 and 3. The delay circuit 62 delays the pulse output from the pump-light control timing pulse circuit 61 according to the value in the register 55.

The microprocessor 33' controls the laser controller 41 based on the automatic gain control timing from the delay circuit 62.

Figure 12:
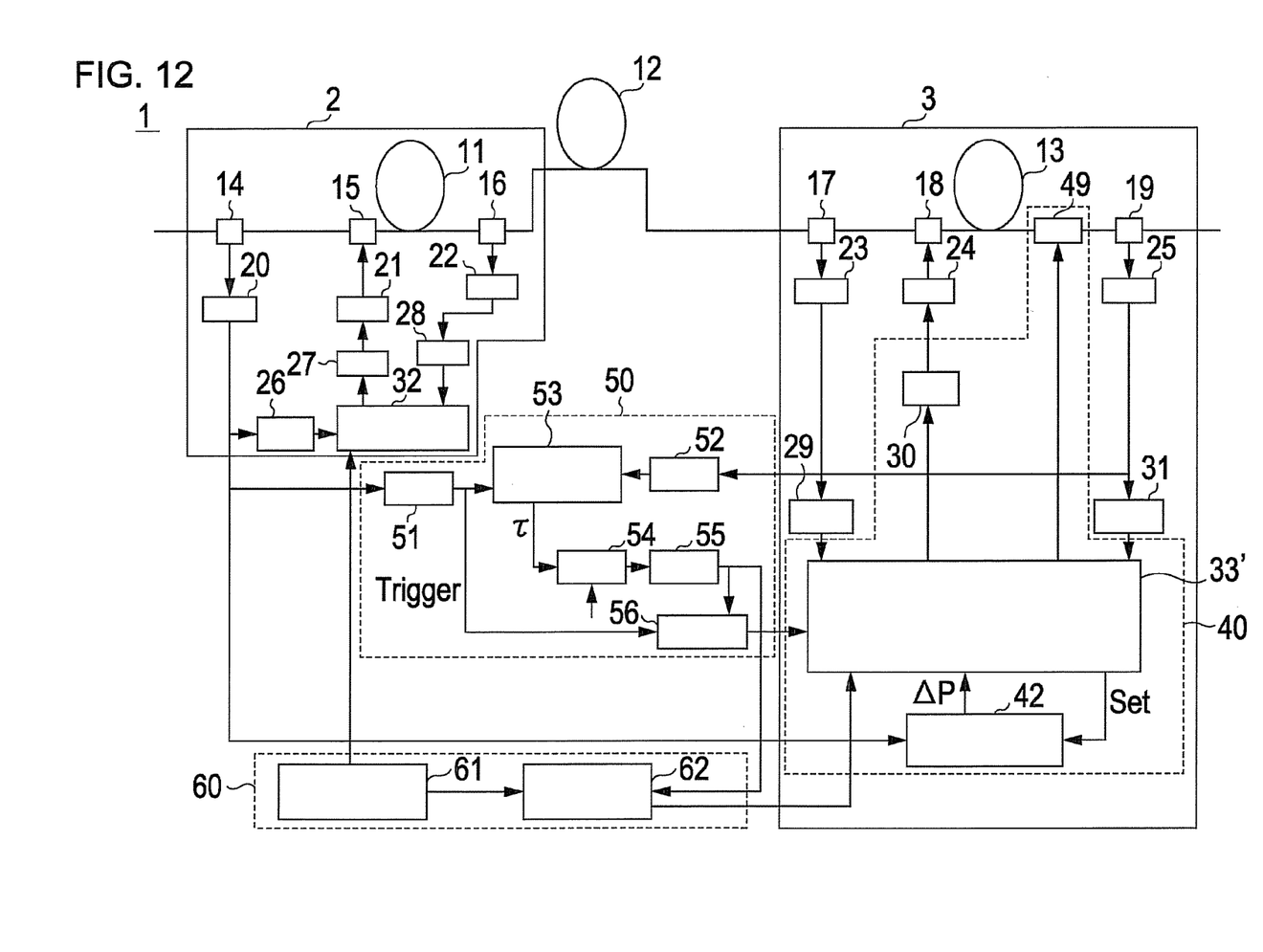
FIG. 12 is a diagram illustrating an eighth configuration of the optical amplifier.

FIG. 12 illustrates an eighth configuration of the optical amplifier 1. In FIG. 12, the same members as in the configuration in FIG. 10 are indicated by the same reference numerals, and a description thereof will be omitted. The configuration in FIG. 12 differs from that in FIG. 10 in that a pump-light control timing circuit 60 is added. The pump-light control timing circuit 60 operates in the same way as that in FIG. 11.

Various features partially selected from the first to eighth configurations of the optical amplifier 1 may be removed or combined as needed.

In the optical amplifier 1, optical amplification is not essential for the first optical amplifying unit 2; it only needs to monitor the light input to the optical amplifier 1. In the first to eighth configurations of the optical amplifier 1 of the optical amplifier 1, therefore, the first optical amplifying unit 2 may have a configuration excluding the components other than the optical coupler 14 and the photodetector 20.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a illustrating of the superiority and inferiority of the embodiment. Although the embodiments have been described in detail, it should be understood that the various changes, substitutions, and alterations could be made hereto without departing from the spirit and scope of the invention.

What is claimed is:

1. An optical amplifier apparatus for amplifying a wavelength division multiplexed signal light, the optical amplifier comprising:
    a detector configured to detect a wavelength division multiplexed signal light;
    a dispersion compensator configured to compensate for a dispersion of the wavelength division multiplexed signal light after being detected by the detector;
    an optical amplifier configured to amplify the wavelength division multiplexed signal light after the wavelength division multiplexed light is compensated for dispersion by the dispersion compensator, the optical amplifier amplifying the wavelength division multiplexed signal light by providing pump light to an optical gain medium including a rare-earth element so that the pump light travels through the optical gain medium as the wavelength division multiplexed light travels through the optical gain medium;
    a propagation delay detector configured to detect a propagation delay time of the wavelength division multiplexed signal light between the detector and the optical amplifier, and to subtract a relaxation time from the detected propagation delay time to thereby provided an adjusted propagation delay time, the relaxation time being a period of time in which electrons of the rare-earth element fall to an energy level causing stimulated emission with the pump light in the optical gain medium; and
    a controller configured to control a gain of the optical amplifier, based on the adjusted propagation delay time such that a change of the gain of the optical amplifier is adjusted by the adjusted propagation delay time.

2. The optical amplifier apparatus according to claim 1, wherein the optical amplifier detects the wavelength division multiplexed signal light input to, and output from, the optical amplifier, and performs automatic gain control based on the detected wavelength division multiplexed signal light input to, and output from, the optical amplifier.

3. The optical amplifier apparatus according to claim 2, wherein the propagation delay detector detects the propagation delay time, based on the wavelength division multiplexed signal light detected by the detector and the detected wavelength division multiplexed signal light input to the optical amplifier.

4. The optical amplifier apparatus according to claim 3, wherein the pump light travels through the optical gain medium in a same direction as the wavelength division multiplexed signal light.

5. The optical amplifier apparatus according to claim 2, wherein the propagation delay detector detects the propagation delay time, based on the wavelength division multiplexed signal light detected by the detector and the wavelength division multiplexed signal light output from optical amplifier.

6. The optical amplifier apparatus according to claim 5, wherein the pump light travels through the optical gain medium in an opposite direction than the wavelength division multiplexed signal light.

7. An optical amplifier apparatus for amplifying a wavelength division multiplexed signal light, the optical amplifier comprising:
    a first optical amplifier configured to amplify the wavelength division multiplexed signal light;
    a dispersion compensator configured to compensate for a dispersion of the wavelength division multiplexed signal light after being amplified by the first optical amplifier;

a second optical amplifier configured to amplify the wavelength division multiplexed signal light after being compensation for dispersion by the dispersion compensator, the second optical amplifier amplifying the wavelength division multiplexed signal light by stimulated emission of an optical gain medium including a rare-earth element;

a propagation delay detector configured to detect a propagation delay time of the wavelength division multiplexed signal light between the first optical amplifier and the second optical amplifier, and to subtract a relaxation time from the detected propagation delay time to thereby provided an adjusted propagation delay time, the relaxation time being a period of time in which electrons of the rare-earth element fall to an energy level causing stimulated emission in the optical gain medium; and a controller configured to control a gain of the second optical amplifier, based on the adjusted propagation delay time such that the first optical amplifier and the second optical amplifier provide a constant total gain, and to adjust a change of the gain of the second optical amplifier by the adjusted propagation delay time.

8. The optical amplifier apparatus according to claim 7, wherein the first optical amplifier detects the wavelength division multiplexed signal light input to, and output from, the first optical amplifier, and performs automatic gain control of the first optical amplifier based on the detected wavelength division multiplexed signal light input to, and output from, the first optical amplifier, and the second optical amplifier detects the wavelength division multiplexed signal light input to, and output from, the second optical amplifier, and performs automatic gain control of the second optical amplifier based on the detected wavelength division multiplexed signal light input to, and output from, the second optical amplifier.

9. The optical amplifier apparatus according to claim 7, wherein the propagation delay detector detects the propagation delay time, based on the wavelength division multiplexed signal light input to the first optical amplifier and the wavelength division multiplexed signal light input to the second optical amplifier.

10. The optical amplifier apparatus according to claim 8, wherein pump light pumps the optical gain medium of the second optical amplifier to amplify the wavelength division multiplexed signal light from a same direction through which the wavelength division multiplexed signal light travels through the optical gain medium.

11. The optical amplifier apparatus according to claim 8, wherein the propagation delay detector detects the propagation delay time, based on the wavelength division multiplexed signal light input to the first optical amplifier and the wavelength division multiplexed signal light output from the second optical amplifier.

12. The optical amplifier apparatus according to claim 8, wherein pump light for pumping the optical gain medium of the second optical amplifier pumps the wavelength division multiplexed signal light from an opposite direction of which the wavelength division multiplexed signal light travels through the optical gain medium.

13. The optical amplifier apparatus according to claim 7, wherein the first optical amplifier includes an optical gain medium including a rare-earth element, and the first optical amplifier causes stimulated emission of the first optical amplifier by adding a pump light to the optical gain medium of the first optical amplifier.

14. The optical amplifier apparatus according to claim 13, wherein the controller synchronizes pump light added by the first and the second optical amplifiers, based on the adjusted propagation delay time.

15. The optical amplifier apparatus according to claim 7, wherein the controller adjusts the change of the gain of the second optical amplifier by the adjusted propagation delay time after a change of the gain of the first optical amplifier.

\* \* \* \* \*